United States Patent
Long

(10) Patent No.: US 12,466,300 B1
(45) Date of Patent: Nov. 11, 2025

(54) VEHICLE-MOUNTED TABLE PLATE FIXED STEERING WHEEL

(71) Applicant: Cheng Long, Jishou (CN)

(72) Inventor: Cheng Long, Jishou (CN)

( * ) Notice: Subject to any disclaimer, the term of this patent is extended or adjusted under 35 U.S.C. 154(b) by 0 days.

(21) Appl. No.: 19/216,443

(22) Filed: May 22, 2025

(30) Foreign Application Priority Data

Apr. 14, 2025 (CN) .......................... 202510462840.8

(51) Int. Cl.
*B60N 3/00* (2006.01)

(52) U.S. Cl.
CPC .................................... *B60N 3/005* (2013.01)

(58) Field of Classification Search
CPC ..................................................... B60N 3/005
USPC ........................................... 108/44, 47, 152
See application file for complete search history.

(56) References Cited

U.S. PATENT DOCUMENTS

| | | | | | |
|---|---|---|---|---|---|
| 1,717,433 | A | * | 6/1929 | Bragg | B43L 3/008 248/447.2 |
| 2,150,709 | A | * | 3/1939 | Bake | B60N 3/005 224/276 |
| 2,211,962 | A | * | 8/1940 | Morris | B60N 3/005 224/276 |
| 2,299,025 | A | * | 10/1942 | McGinley | B60N 3/005 D6/406.3 |
| 2,314,550 | A | * | 3/1943 | Olman | B60N 3/005 108/44 |
| 2,746,821 | A | * | 5/1956 | Schroeder | B60N 3/005 108/166 |
| 2,867,401 | A | * | 1/1959 | Sheahan | A47C 7/68 248/362 |
| 3,097,884 | A | * | 7/1963 | Alford | A47C 7/68 108/152 |
| 3,643,606 | A | * | 2/1972 | Vise | B60N 3/005 108/44 |
| 5,060,581 | A | * | 10/1991 | Malinski | B60N 3/005 248/441.1 |
| 5,148,755 | A | * | 9/1992 | Morales | A47B 97/00 248/909 |
| 5,177,665 | A | * | 1/1993 | Frank | G06F 1/1632 224/276 |
| 5,320,321 | A | * | 6/1994 | Muncada | B60N 2/24 248/443 |

(Continued)

FOREIGN PATENT DOCUMENTS

JP 2008290597 A * 12/2008 ............. B60N 3/005

*Primary Examiner* — Jose V Chen
(74) *Attorney, Agent, or Firm* — JEEN IP LAW, LLC

(57) ABSTRACT

Disclosed in the present disclosure is a vehicle-mounted table plate fixed to a steering wheel. The vehicle-mounted table plate fixed to a steering wheel includes a base plate; a base, where the base plate is rotationally connected or fixedly connected at one end of the base; and at least two clamping arms having the same structure or different structures, where the clamping arms are connected at a front end of the base in a back-and-forth stretchable manner, each clamping arm includes a clamping hook rotationally connected to a front end of the clamping arm, and the clamping hooks are used for being clamped on the steering wheel of a vehicle. Clamping gaps between the clamping hooks and the base are adjusted by moving the clamping arms back and forth to achieve mounting and fixing of the table plate fixed to a steering wheel.

9 Claims, 19 Drawing Sheets

(56) References Cited

U.S. PATENT DOCUMENTS

| | | | | |
|---|---|---|---|---|
| 5,385,283 A * | 1/1995 | Shioda | | B60N 3/005 |
| | | | | 224/276 |
| 5,511,493 A * | 4/1996 | Kanehl, Jr. | | B60N 3/001 |
| | | | | 108/47 |
| 5,653,178 A * | 8/1997 | Huczka | | A47B 96/067 |
| | | | | 108/135 |
| 5,662,047 A * | 9/1997 | Metcalf | | B60N 3/005 |
| | | | | 224/276 |
| 5,722,329 A * | 3/1998 | Weng | | A47B 5/00 |
| | | | | 108/47 |
| 5,722,586 A * | 3/1998 | Hansen | | B60N 3/004 |
| | | | | 108/47 |
| 6,036,158 A * | 3/2000 | Raasch | | B60N 3/005 |
| | | | | 248/441.1 |
| 6,038,983 A * | 3/2000 | Lendl | | B60N 3/005 |
| | | | | 224/276 |
| 6,279,800 B1 * | 8/2001 | Lee | | B60N 3/005 |
| | | | | 224/276 |
| 6,408,769 B1 * | 6/2002 | Lewis | | B60N 3/005 |
| | | | | 108/9 |
| 6,494,148 B1 * | 12/2002 | Mullaney | | B60N 3/005 |
| | | | | 108/47 |
| 8,327,774 B1 * | 12/2012 | Rivera | | B60N 3/005 |
| | | | | 108/50.02 |
| 8,857,347 B1 * | 10/2014 | Liu | | A47B 5/02 |
| | | | | 108/47 |
| 9,021,963 B1 * | 5/2015 | Jacobsen | | A45C 9/00 |
| | | | | 108/44 |
| 9,062,821 B2 * | 6/2015 | Jensen | | F16M 11/041 |
| 11,945,374 B1 * | 4/2024 | Wang | | B60R 11/0252 |
| 2005/0076815 A1 * | 4/2005 | Twyford | | B60N 3/005 |
| | | | | 108/44 |
| 2005/0077334 A1 * | 4/2005 | Craig | | B60N 3/005 |
| | | | | 224/276 |
| 2005/0193925 A1 * | 9/2005 | Wesolek | | B60N 3/005 |
| | | | | 108/44 |
| 2005/0223952 A1 * | 10/2005 | Brewer | | A47J 37/1271 |
| | | | | 108/152 |
| 2006/0032410 A1 * | 2/2006 | Miller | | B60N 3/005 |
| | | | | 108/44 |
| 2006/0107878 A1 * | 5/2006 | Cassata | | B60N 3/005 |
| | | | | 108/44 |
| 2006/0289576 A1 * | 12/2006 | Krusell | | B60R 7/08 |
| | | | | 224/276 |
| 2007/0101908 A1 * | 5/2007 | Makita | | A47B 5/02 |
| | | | | 108/47 |
| 2009/0084291 A1 * | 4/2009 | Long | | B60N 3/005 |
| | | | | 108/44 |
| 2011/0240697 A1 * | 10/2011 | Stephens | | B60N 3/005 |
| | | | | 224/400 |
| 2012/0104061 A1 * | 5/2012 | Stroh | | B60N 3/103 |
| | | | | 224/276 |
| 2016/0157603 A1 * | 6/2016 | Graham | | B60N 3/001 |
| | | | | 108/44 |
| 2016/0325662 A1 * | 11/2016 | Nash | | B62D 1/04 |
| 2017/0274806 A1 * | 9/2017 | Van Blarcom | | B60N 3/005 |
| 2018/0304792 A1 * | 10/2018 | Syrianos | | B60N 3/005 |
| 2022/0134929 A1 * | 5/2022 | Machuszek | | B60N 3/005 |
| | | | | 224/276 |
| 2022/0281508 A1 * | 9/2022 | Gangisetty | | B60N 3/005 |
| 2024/0083320 A1 * | 3/2024 | Martinez | | B60N 3/001 |

* cited by examiner

VEHICLE-MOUNTED TABLE PLATE FIXED STEERING WHEEL

TECHNICAL FIELD

The present disclosure relates to the technical field of vehicle-mounted accessories for vehicles, and in particular to a vehicle-mounted table plate fixed to a steering wheel.

BACKGROUND

A vehicle-mounted table plate fixed to a steering wheel is a table plate which is fixed to the steering wheel and used for allowing a driver to place articles or a notebook computer thereon.

However, an existing vehicle-mounted table plate fixed to a steering wheel cannot be mounted on steering wheels of various different vehicle models in a matching manner, and the vehicle-mounted table plate has poor versatility and stability. Moreover, a visual angle of the notebook computer cannot be adjusted, which affects an experience feeling. Therefore, further improvement needs to be made.

SUMMARY

An objective of the present disclosure is to provide a vehicle-mounted table plate fixed to a steering wheel, aiming at solving the problem that an existing mechanism for connection and fixation has poor adaptability and stability.

The present disclosure is implemented as follows: a vehicle-mounted table plate fixed to a steering wheel, including:
  abase plate;
  a base, where the base plate is rotationally connected or fixedly connected at one end of the base; and
  at least two clamping arms having the same structure or different structures, where the clamping arms are connected at a front end of the base in a back-and-forth stretchable manner, each clamping arm includes a clamping hook rotationally connected to a front end of the clamping arm, the clamping hooks are used for being clamped on the steering wheel of a vehicle, and clamping gaps between the clamping hooks and the base are adjusted by moving the clamping arms back and forth to achieve mounting and fixing of the table plate fixed to a steering wheel.

Further, two mounting cavities for mounting the clamping arms are formed in the base, avoidance holes are formed in tops of the mounting cavities, and first teeth are arranged on one side or two sides of each avoidance hole and are located on an inner wall of the corresponding mounting cavity.

The first teeth and the corresponding avoidance hole are positioned on the same wall surface of the mounting cavity.

Further, the clamping arm further includes a sliding seat, the sliding seat is slidably connected in the mounting cavity, the clamping hook is connected to the sliding seat in a damping rotation manner, and the clamping hook is provided with an arc-shaped groove that matches an annular grip on the steering wheel.

Further, the sliding seat further includes a first key body and a first reset spring that are arranged inside the sliding seat, the first reset spring is located below the first key body, and the first reset spring is used for achieving pressing and resetting of the first key body.

The first key body includes second teeth and a convex top column that are arranged on an upper surface of the first key body, the second teeth and the convex top column penetrate through a housing of the sliding seat, the second teeth are meshed with the first teeth in the mounting cavity, and the top column penetrates a first avoidance hole and extends out of the base.

Further, the clamping arm includes a rotating shaft, the clamping hook is fixedly connected to one end of the rotating shaft fixedly connected to the clamping hook, a shaft hole matching the rotating shaft is formed in the front end of the base, the rotating shaft is inserted in the shaft hole, and the clamping arm is rotationally connected to the base through the rotating shaft.

Further, the base includes a second reset spring, a fixing nut and an adjusting threaded rod, where the second reset spring and the fixing nut are located inside a housing of the base, through holes are reserved in the rotating shaft and the clamping hook, the fixing nut is arranged in the shaft hole, and the adjusting threaded rod passes through the through hole in the clamping arm and is in butt joint with the fixing nut in the shaft hole.

The second reset spring is arranged on the adjusting threaded rod in a sleeving manner, and the second reset spring abuts against the rotating shaft on the clamping hook to form elastic support for back-and-forth movement of the clamping arm.

Further, the base plate includes a supporting assembly arranged on the base plate, one end of the supporting assembly is connected to the base, and the other end of the supporting assembly is connected to the base plate, so as to form a horizontal supporting effect on the base plate.

Further, the supporting assembly includes a first connecting member, a second connecting member and a third connecting member, where one end of the first connecting member is rotationally connected to the base, the other end of the first connecting member is rotationally connected to the second connecting member, one end of the third connecting member is rotationally connected to the base plate, and the third connecting member is slidably connected to the second connecting member back and forth. A locking mechanism is arranged between the third connecting member and the second connecting member, and the locking mechanism is used for locking and unlocking a back-and-forth sliding position of the third connecting member.

Further, the locking mechanism includes a second key body, a third reset spring and third teeth, where the second key body and the third reset spring are arranged inside a housing of the second connecting member, the third reset spring is located below the second key body, and the third reset spring is used for achieving pressing and resetting of the second key body.

The second key body and the first key body have the same structure, an upper surface of the second key body is also provided with second teeth and a convex top column, the third teeth are arranged inside a housing of the third connecting member, and the third teeth are arranged corresponding to and meshed with the second teeth on the second key body.

Further, the base plate further includes a limiting mechanism fixedly connected or slidably connected back and forth on the base plate, and the limiting mechanism includes a limiting arm fixedly connected or rotationally connected on the limiting mechanism.

Compared with the prior art, the present disclosure has the beneficial effects as follows:

1. In the present disclosure, the two clamping arms which can move back and forth are arranged, and a user is allowed to adjust the clamping gaps between the base and the clamping hooks, so as to match steering wheels of different vehicle models. Moreover, stability is better, and market applicability and use scenarios of the vehicle-mounted table plate fixed to a steering wheel are effectively enhanced.

2. In the present disclosure, the supporting assembly is arranged, and horizontal support for the base plate is realized through the supporting assembly, such that stability of the base plate is improved. Furthermore, the base plate is rotationally connected to the base, and a pitching angle of the base plate can be controlled through adjustment of the supporting assembly, so as to optimize user experience.

3. In the present disclosure, the limiting arm is arranged, such that when a notebook computer or a tablet computer is used, the limiting arm can be used for limiting the notebook computer or the tablet computer, so as to prevent the computer from sliding. Moreover, the limiting mechanism can be moved forward and backward, such that the computer can be moved forward and backward, and an inclined angle of the computer during placement can be adjusted, thereby finding an optimal visual angle and meeting use requirements of different users.

DETAILED DESCRIPTIONS OF THE EMBODIMENTS

Figure 1:
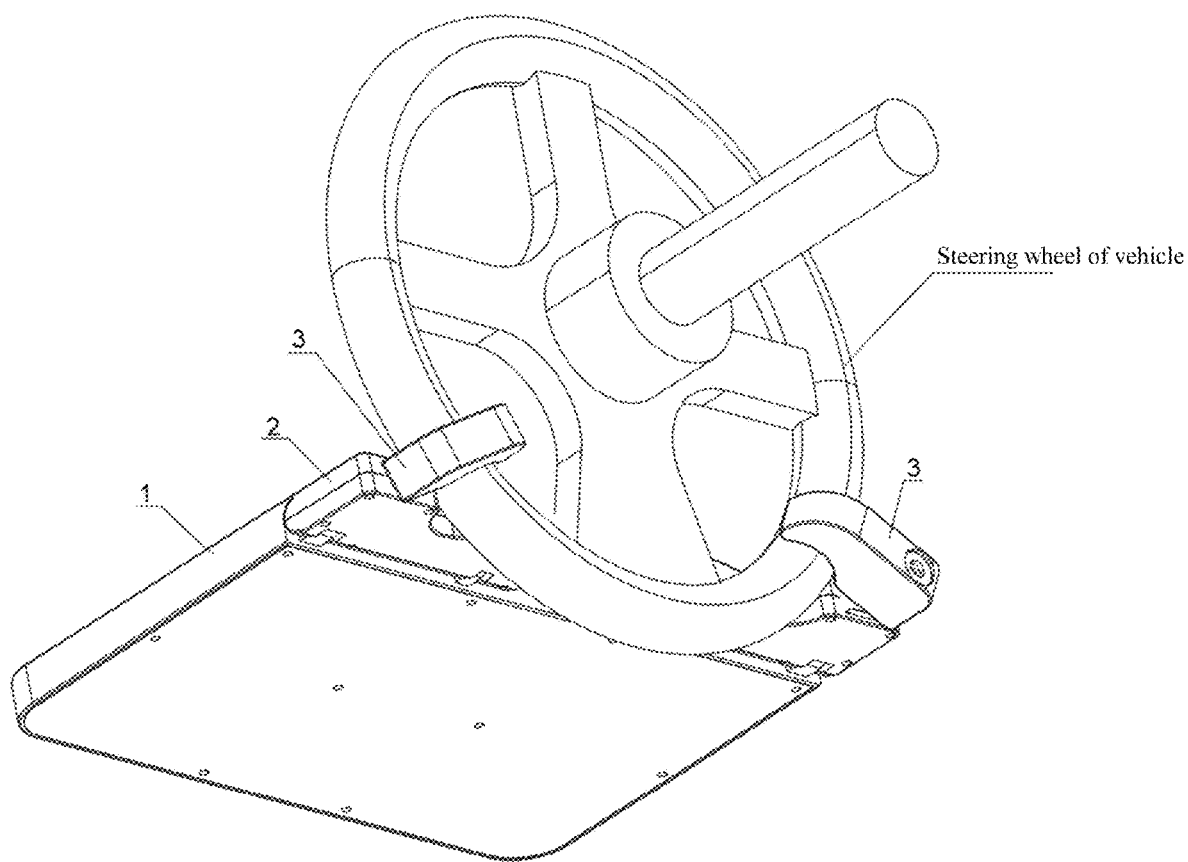
FIG. 1 is a diagram for a use state showing integral mounting on a steering wheel in Example 1 of the present disclosure.
Figure 2:
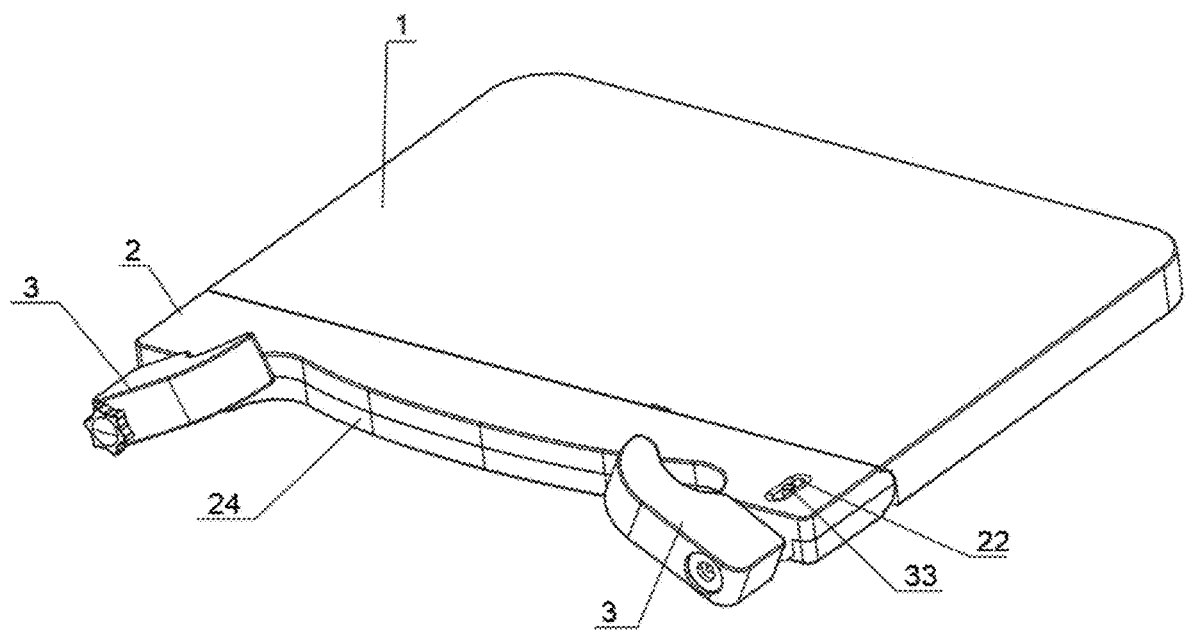
FIG. 2 is a schematic diagram of an integral structure of Example 1 of the present disclosure.
Figure 3:
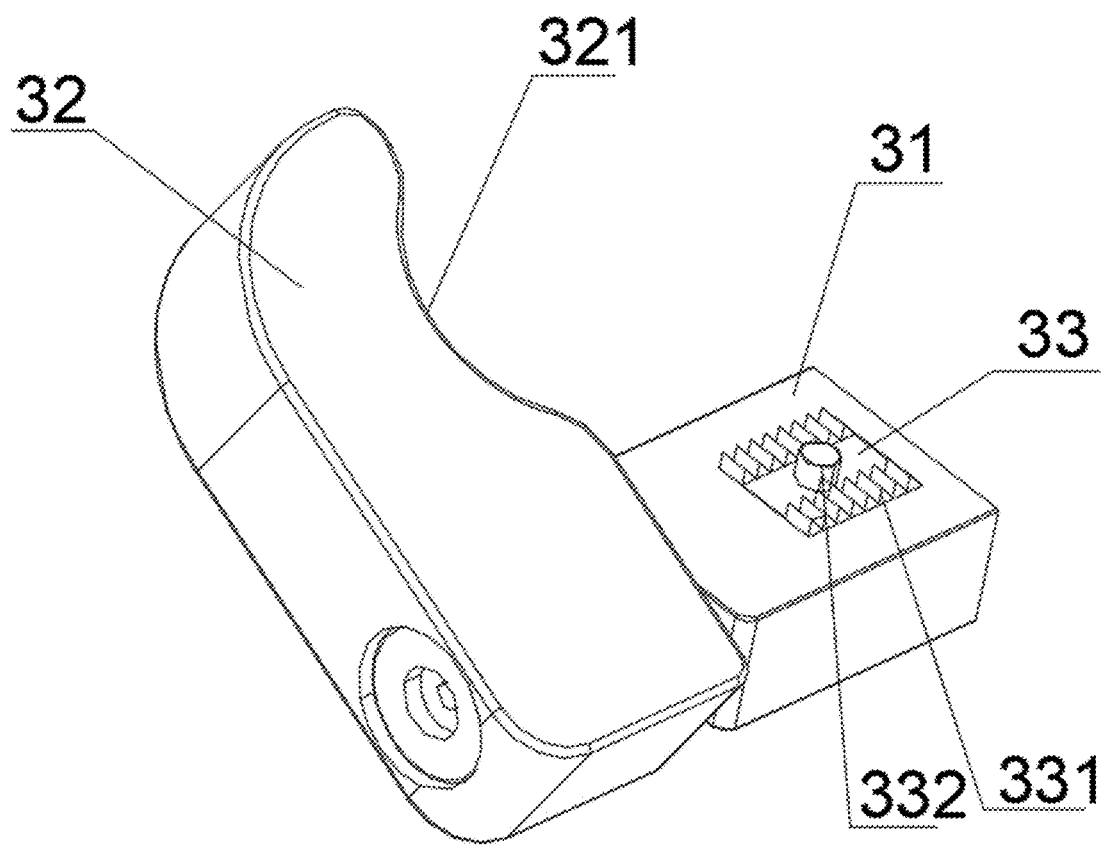
FIG. 3 is a schematic structural diagram of a clamping arm in Example 1 of the present disclosure.
Figure 4:
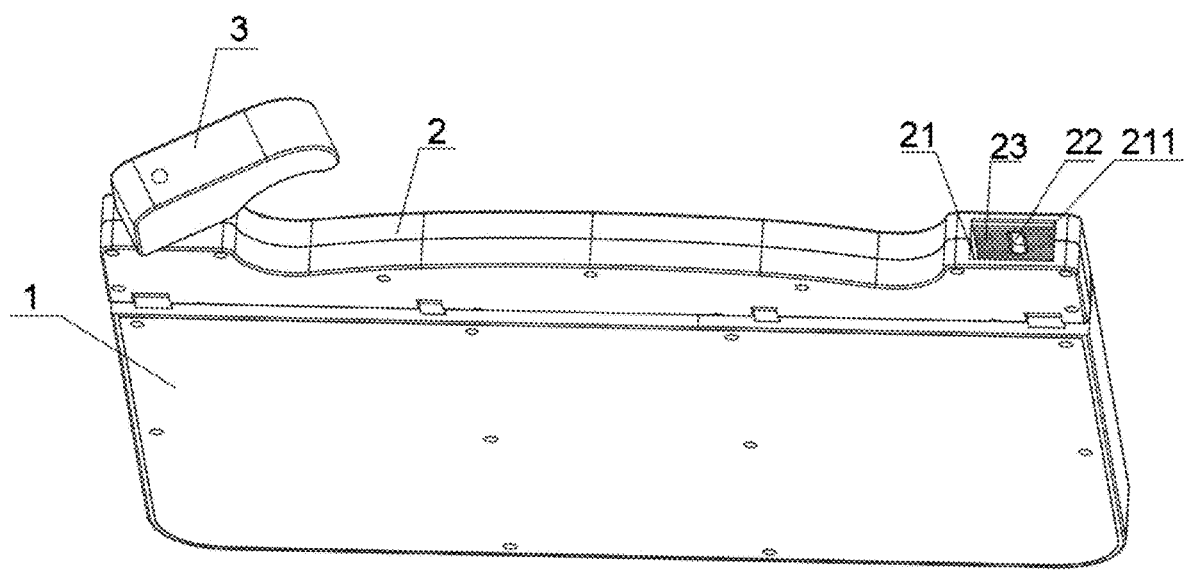
FIG. 4 is a schematic structural diagram of a mounting cavity in Example 1 of the present disclosure.
Figure 5:
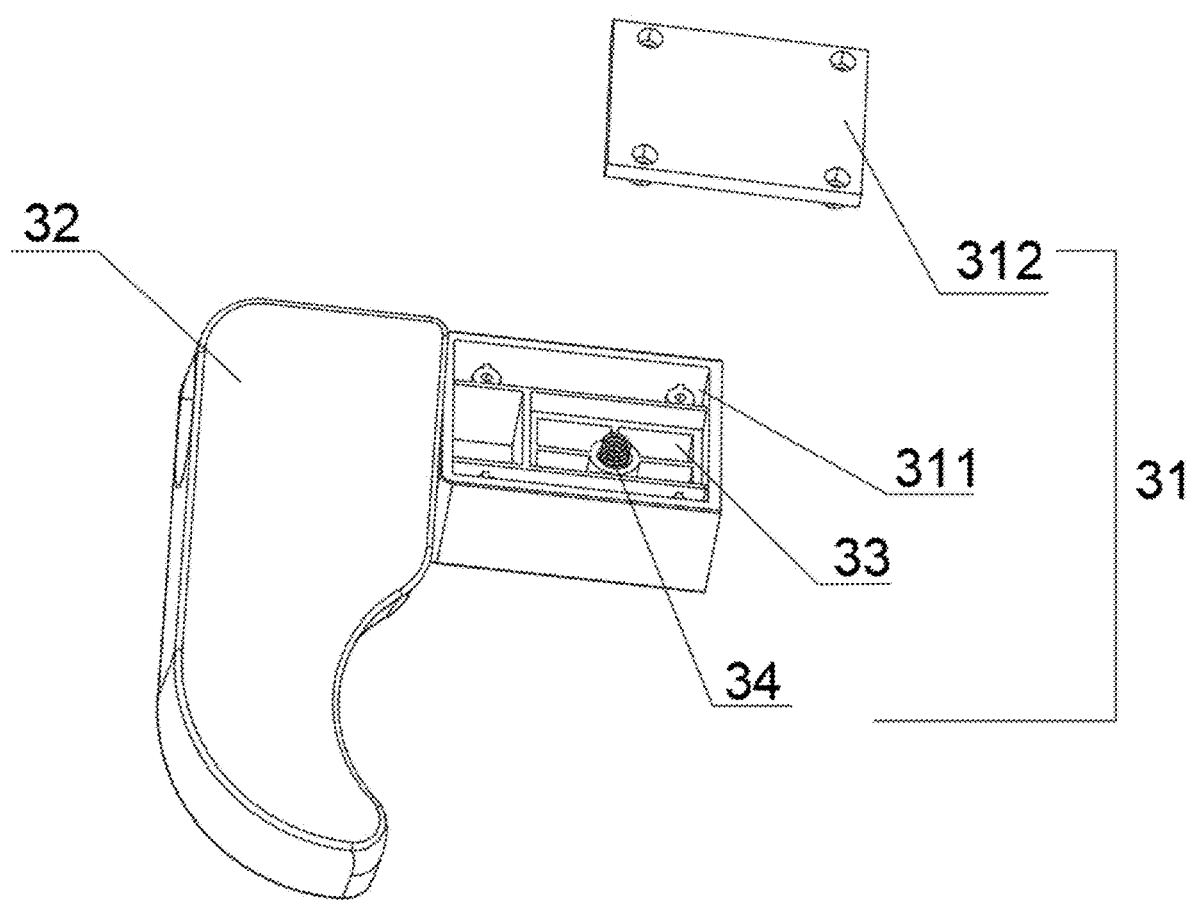
FIG. 5 is a schematic diagram of an integral structure of a clamping arm in Example 1 of the present disclosure.

In the present disclosure, unless otherwise explicitly specified and defined, the terms "mounting", "connecting", "connection", "fixing", etc. should be understood in a broad sense, for example, they may denote fixed connection, detachable connection, or integrated connection, denote mechanical connection or electrical connection, denote direct connection or indirect connection via an intermediate medium, or denote communication between interiors of two elements or interaction between two elements. The specific meanings of the above terms in the present disclosure may be understood on a case-by-case basis for those of ordinary skill in the art.

A further specification is made below with reference to the accompanying drawings and in conjunction with particular examples:

Example 1

As shown in FIGS. 1-5 and FIG. 11, a vehicle-mounted table plate fixed to a steering wheel, including a base plate 1, a base 2, where the base plate 1 is rotationally connected or fixedly connected at one end of the base 2; and at least two clamping arms 3 having the same structure or different structures. In the example of the present disclosure, the base plate 1 is rotationally connected to the base 2 through a rotating shaft, the base plate 1 rotates up and down relative to the base 2, and the two clamping arms 3 have the same structure. The clamping arms 3 are detachably connected at a front end of the base 2 in a back-and-forth stretchable manner, each clamping arm 3 includes a clamping hook 32 rotationally connected to a front end of the clamping arm 3, and the clamping hooks 32 are used for being clamped on the steering wheel of a vehicle. Clamping gaps between the clamping hooks 32 and the base 2 are adjusted by moving the clamping arms 3 back and forth to achieve mounting and fixing of the table plate fixed to a steering wheel.

The front end of the base 2 is provided with two mounting cavities 21 for mounting the clamping arms 3, the mounting cavities 21 are rectangular cavities or polygonal cavities or circular cavities of any shape, and the two mounting cavities 21 are located on a left side and a right side of the front end of the base 2 respectively. An arc-shaped avoidance groove 24 with symmetrical two ends is formed between the two mounting cavities 21, and an anti-skid rubber pad is arranged in the arc-shaped avoidance groove 24. For the table plate fixed to a steering wheel in a mounted state, a lower end of the steering wheel is in contact with the arc-shaped avoidance groove 24 to form a limiting effect. By arranging the anti-skid rubber pad, the base 2 is prevented from scratching leather wrapped outside the steering wheel, and stability can be increased. First avoidance holes 22 penetrating the mounting cavities 21 are formed in the base 2, and the first avoidance holes 22 are located in top of the mounting cavities 21. Each first avoidance hole 22 is a rectangular hole with a certain length, and the first avoidance hole 22 is longitudinally arranged in a lengthwise direction of the mounting cavity 21 to facilitate forward and backward movement of a first key body 33. First teeth 23 are arranged on an inner wall 211 of each mounting cavity 21, the first teeth 23 are located on one side or two opposite sides of and each first avoidance hole 22, and the first teeth 23 and the first avoidance hole 22 are located on the same wall surface of the mounting cavity 21. Each clamping arm 3 further includes a sliding seat 31, the sliding seat is slidably connected in the mounting cavity 21, and the clamping hook 32 is connected to the sliding seat 31 in a damping rotation manner. The clamping hook 32 is arranged at a front end of the sliding seat 31, a damping ring is arranged between the clamping hook 32 and the sliding seat 31 to increase the stability and a damping effect of the clamping hook 32 during rotation, and the sliding seat 31 matches the mounting cavity 21. The clamping arm 3 is an L-shaped structure body as a whole, an arc-shaped groove 321 matching an annular grip of the steering wheel of the vehicle is arranged on the clamping hook 32, and the arc-shaped groove 321 is in a spiral design. The clamping hook 32 is provided with the arc-shaped groove 321, the arc-shaped groove 321 is an arc-shaped groove body that is in the spiral design, and the arc-shaped groove 321 is located in an inner side of the clamping hook 32. In a mounted and fixed state of the table plate fixed to a steering wheel, the arc-shaped groove 321 in the clamping hook 32 is in contact with and closely attached to the annular grip on the steering wheel, thereby increasing the stability of the table plate. A flexible pad 3211 is fixedly arranged in the arc-shaped groove 321, and the flexible pad 3211 is arranged as any one of flexible silica gel, flexible plastic or cloth, so as to prevent the clamping hook 32 from scratching a leather material wrapped on an outer surface of the steering wheel of the vehicle. The clamping arm 3 is arranged in the mounting cavity 21 in a back-and-forth sliding manner through the sliding seat 31. The sliding seat 31 includes the first key body 33 and a first reset spring 34 arranged inside a housing of the sliding seat 31, the housing of the sliding seat 31 includes an upper housing 311 and a bottom housing 312, an accommodating cavity body is formed between the upper housing 311 and the bottom housing 312, and the first key body 33 and the first reset spring 34 are mounted in the accommodating cavity body. The bottom housing 312 is detachably connected to the upper housing 311 through screws or buckles so as to be assembled with the first key body 33 and the first reset spring 34. A top end of the first reset spring 34 makes contact with a bottom of the first key body 33, a bottom end of the first reset spring 34 abuts against a bottom of the accommodating cavity, and the first key body 33 is connected to the sliding seat 31 through up-and-down pressing. The first reset spring 34 is arranged below the first key body 33, and the first reset spring 34 is used for achieving pressing and resetting of the first key body 33. An upper surface of the first key body 33 is provided with second teeth 331 and a convex top column 332, the second teeth 331 and the convex top column 332 penetrate through the housing of the corresponding sliding seat 31, the second teeth 331 are meshed with the first teeth 23 on the mounting cavity 21, and the top column 332 penetrates the first avoidance hole 22 and extends out of a housing of the base 2. When the user needs to move the clamping arm 3 forward or backward, only the top column 332 on the first key body 33 needs to be pressed, the first reset spring 34 is compressed by a pressing force to generate deformation, the first key body 33 slides downward at the same time, and the second teeth 331 on the first key body 33 are separated from the first teeth 23 on the inner wall of the mounting cavity 21. In this case, the clamping arm 3 is in an unlocked state, and the clamping arm 3 can slide back and forth in a lengthwise direction of the mounting cavity 21, or the sliding seat of the clamping arm 3 can be pulled out of the mounting cavity 21, such that the clamping arm 3 is dismounted, and the whole table plate can be stored. When the user releases the first key body 33, the first reset spring 34 is reset, the first key body 33 slides upward to restore to an initial state, the second teeth 331 on the first key body 33 are meshed with the first teeth 23 on the inner wall of the mounting cavity 21, forming a locking state for the clamping arm 3. A length of the avoidance hole 22 is a distance by which the clamping arm 3 moves back and forth. If the clamping arm 3 is moved backward, the clamping hook 32 on the clamping arm 3 is far away from the base 2, and the clamping gap between the clamping hook 32 and the base 2 increases. If the clamping arm 3 is moved forward, the clamping hook 32 on the clamping arm 3 approaches the base 2, and the clamping gap between the clamping hook 32 and the base 2 is reduced.

Thus, the two clamping arms 3 which can move back and forth are arranged, and the user is allowed to adjust the clamping gaps between the base 2 and the clamping hooks 32, so as to match steering wheels of different vehicle models. Moreover, by utilizing cooperation between the clamping hooks 32 and the base 2, a fixing effect is better, and market applicability and use scenarios of the vehicle-mounted table plate fixed to a steering wheel are effectively enhanced.

Example 2

Figure 6:
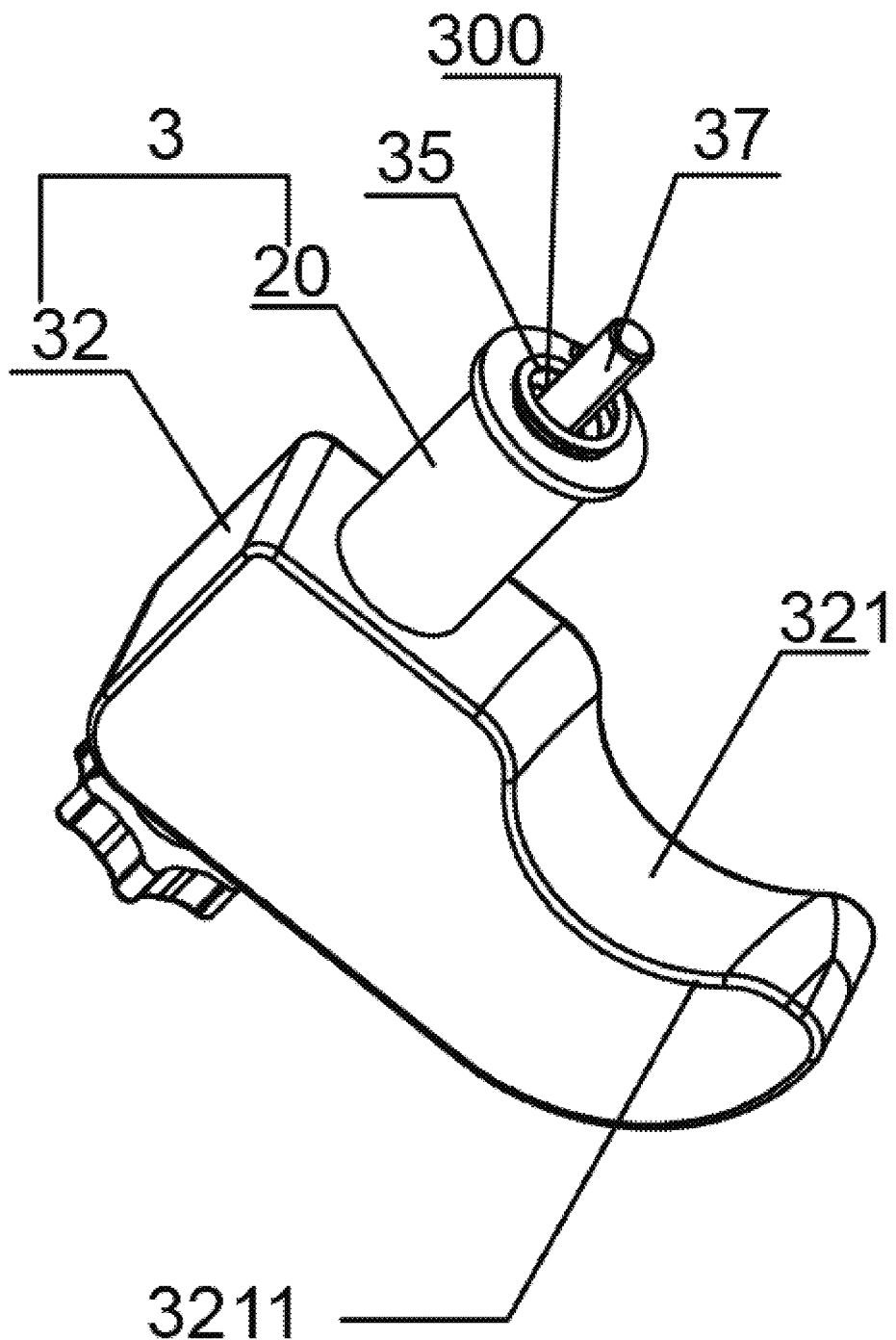
FIG. 6 is a schematic structural diagram of a clamping arm in Example 2 of the present disclosure.
Figure 7:
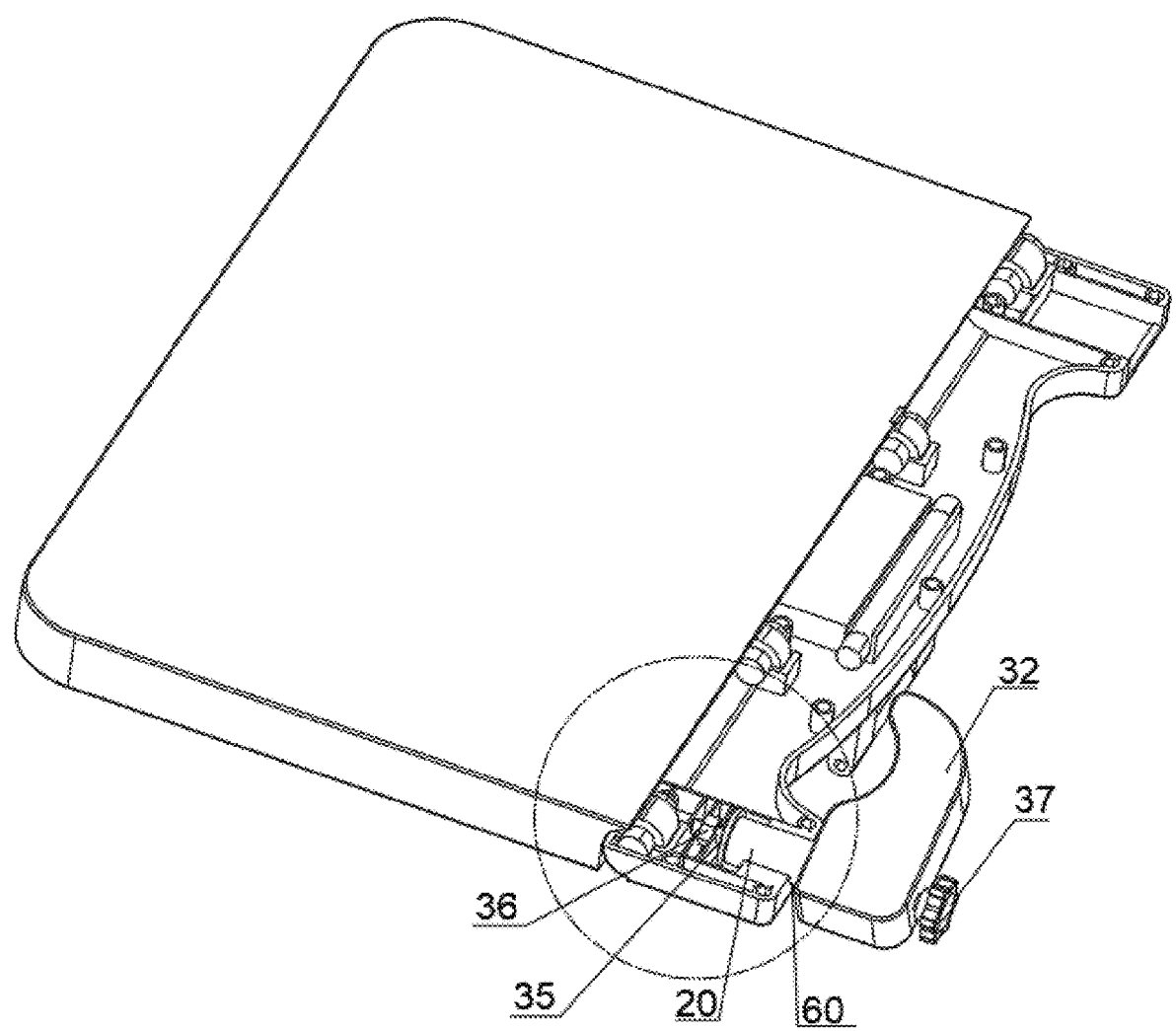
FIG. 7 is a schematic diagram showing mounting of a clamping arm in Example 2 of the present disclosure.
Figure 8:
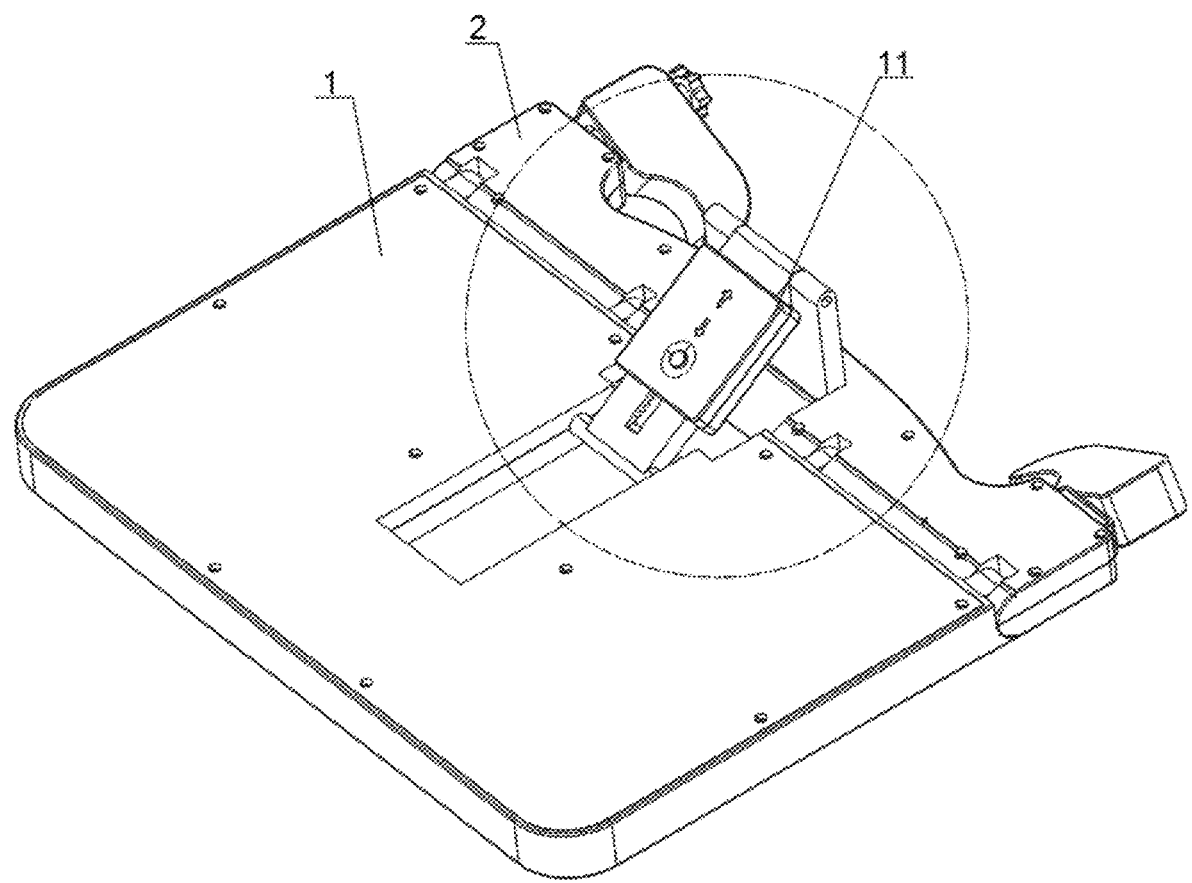
FIG. 8 is a schematic structural diagram of a supporting assembly in Example 3 of the present disclosure.
Figure 9:
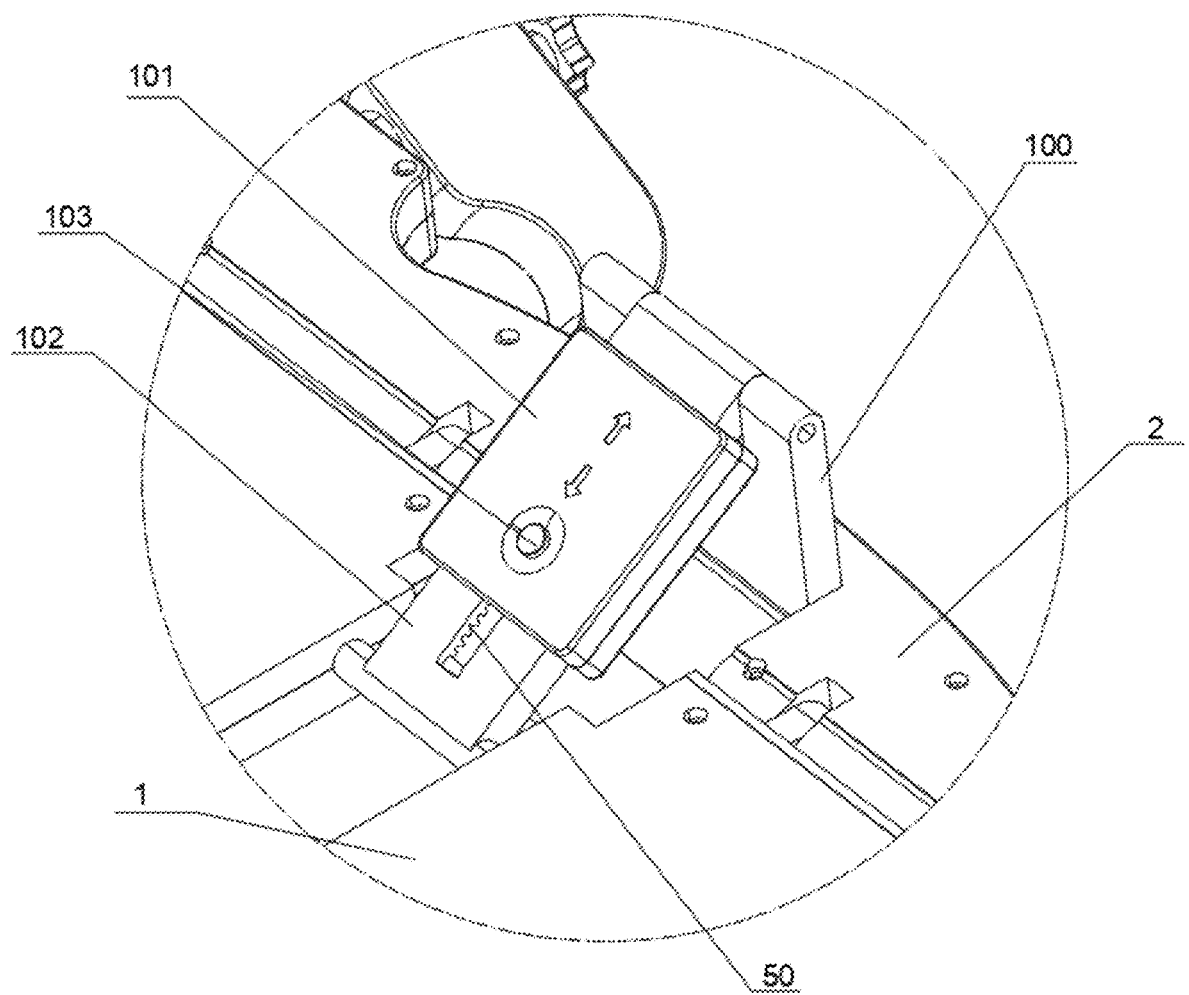
FIG. 9 is a partial enlarged schematic structural diagram of FIG. 8 in Example 3 of the present disclosure.
Figure 10:
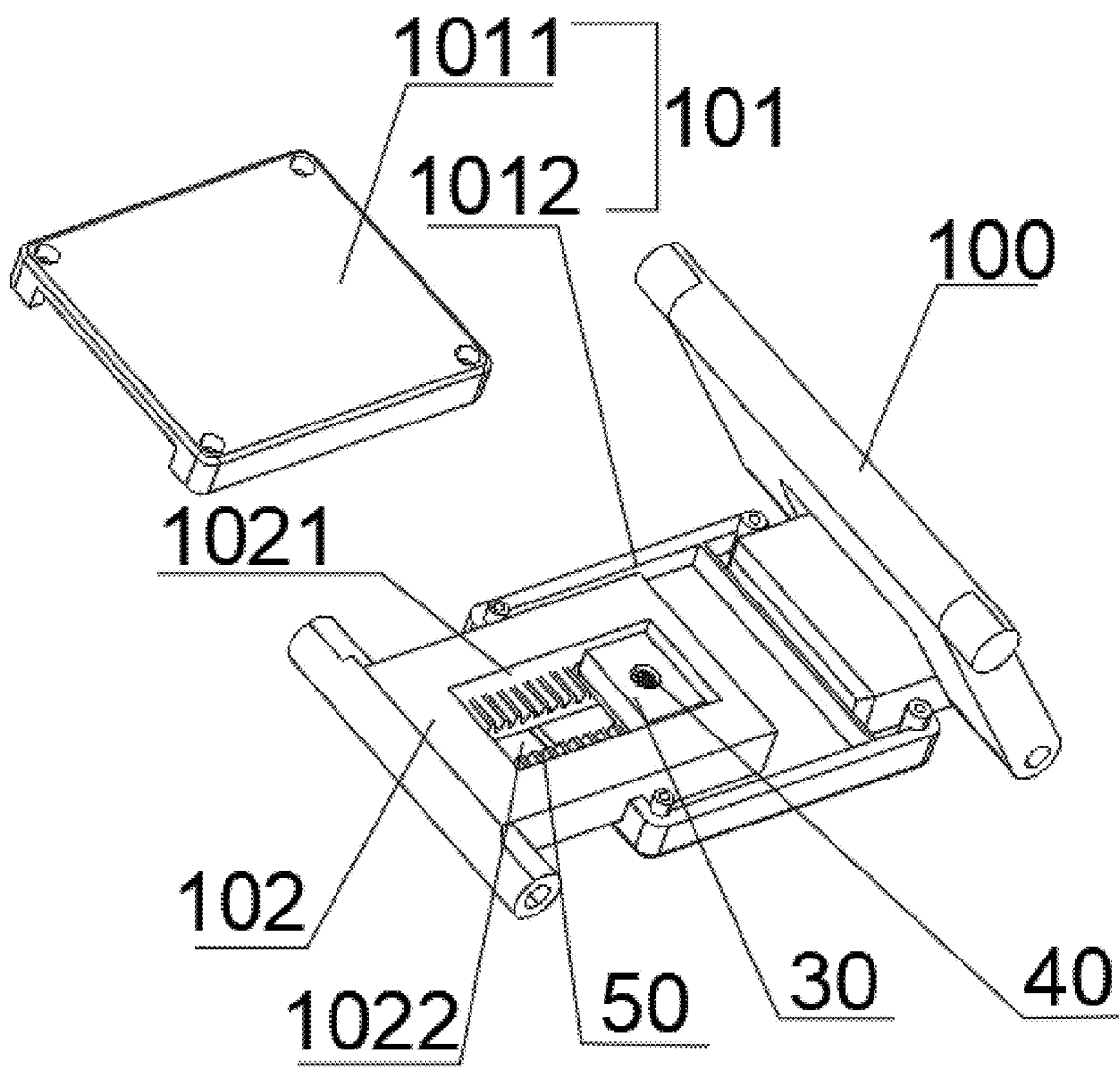
FIG. 10 is an exploded state diagram of a supporting assembly in Example 3 of the present disclosure.
Figure 11:
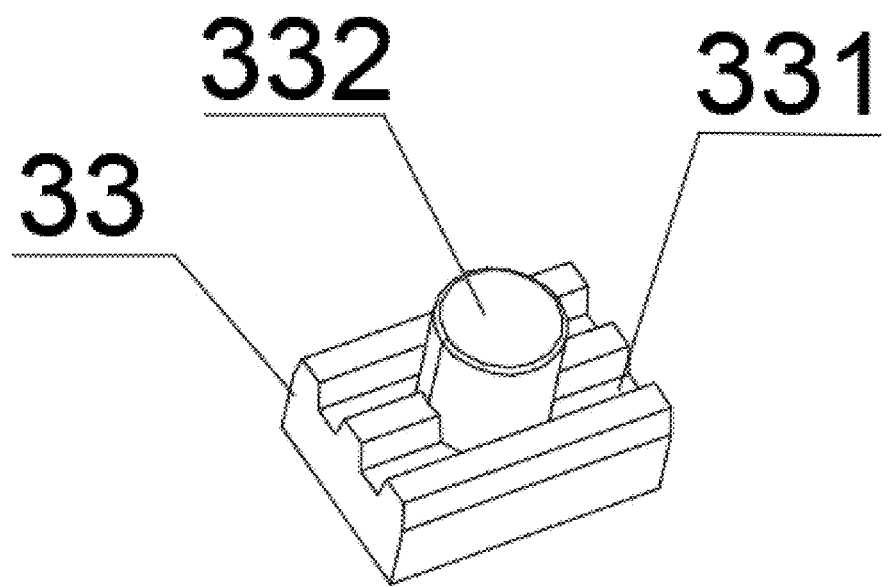
FIG. 11 is a schematic structural diagram of a key body in Example 1 and Example 3 of the present disclosure.

As shown in FIG. 6 and FIG. 7, the improvement point of this example lies in that the clamping arm 3 includes a rotating shaft 20 fixedly connected to the clamping hook 32, a shaft hole 60 matching the rotating shaft 20 is formed in a front end of the base 2, the rotating shaft 20 is inserted in the shaft hole 60, and the clamping arm 3 is rotationally connected to the base 2 through the rotating shaft 20. The base 2 includes a second reset spring 35, a fixing nut 36 and an adjusting threaded rod 37, the second reset spring 35 and the fixing nut 36 are located inside the housing of the base 2, and the fixing nut 36 is fixedly mounted in the shaft hole 60. Through holes 300 are reserved in the rotating shaft 20 and the clamping hook 32, and the adjusting threaded rod 37 passes through the through holes 300 and is in butt joint with the fixing nut 36 located inside the shaft hole 60. A front end of the adjusting threaded rod 37 is provided with external threads of a certain length, the external threads match internal threads on the fixing nut 36, the adjusting threaded rod 37 is connected to the fixing nut 36 through the threads, and a rear end of the adjusting threaded rod 37 is a twisting handle. The second reset spring 35 is arranged on the adjusting threaded rod 37 in a sleeving manner, a front end of the second reset spring 35 abuts against the rotating shaft 20 on the clamping arm 3, and a rear end of the second reset spring 35 abuts against the inner wall of the corresponding shaft hole 60, forming elastic support for back-and-forth movement of the clamping arm 3. In this example, the shaft hole 60 is a cylindrical cavity, the rotating shaft 20 matches the shaft hole 60, and the rotating shaft 20 is inserted into the shaft hole 60. When the user needs to move the base plate 1 back and forth, the adjusting threaded rod 37 can be turned counterclockwise or clockwise, the clamping arm 3 can move back and forth in the lengthwise direction of the mounting cavity 21 under thrust or a pulling force of the adjusting threaded rod 37. If the clamping arm 3 is moved backward, the clamping hook 32 on the clamping arm 3 is far away from the base 2, and the clamping gap between the clamping hook 32 and the base 2 increases. If the clamping arm 3 is moved forward, the clamping hook 32 on the clamping arm 3 approaches the base 2, and the clamping gap between the hook 32 and the base 2 decreases. When the clamping hook 32 of the clamping arm 3 is moved to be close to an innermost side of the base 2, the second reset spring 35 is in a compressed state. When the adjusting threaded rod 37 is turned counterclockwise or clockwise, under the restoring force of the second reset spring 35, the clamping arm 3 automatically moves forward to form elastic support for the clamping arm 3 so as to prevent the clamping arm 3 from shaking. When the adjusting threaded rod 37 is completely separated from the fixing nut 36, the clamping arm 3 can be dismounted, such that adjustment, dismounting and mounting are quite convenient.

Example 3

As shown in FIGS. 8-11, the base plate 1 is provided with a supporting assembly 11, one end of the supporting assembly 11 is connected to the base 2, and the supporting assembly 11 is located at bottoms of the base plate 1 and the base 2. The other end of the supporting assembly 11 is connected to the base plate 1 to form a horizontal supporting effect on the base plate 1. The supporting assembly 11 includes a first connecting member 100, a second connecting member 101 and a third connecting member 102, where one end of the first connecting member 100 is rotationally connected to the base 2, the other end of the first connecting member 100 is rotationally connected to the second connecting member 101, one end of the third connecting member 102 is rotationally connected to the base plate 1, and the third connecting member 102 is slidably connected to the second connecting member 101 back and forth. A locking mechanism is arranged between the third connecting member 102 and the second connecting member 101, and the locking mechanism is used for locking and unlocking a back-and-forth sliding position of the third connecting member 102. The locking mechanism includes a second key body 30, a third reset spring 40 and third teeth 50, where the second key body 30 and the third reset spring 40 are arranged inside a housing of the second connecting member 101. The housing of the second connecting member 101 includes a top housing 1011 and a lower housing 1012, the top housing 1011 is detachably connected to the lower housing 1012 through screws or buckles, a sliding cavity with a certain length is formed between the top housing 1011 and the lower housing 1012, and one end of the third connecting member 102 is inserted into the sliding cavity. The third reset spring 40 is arranged below the second key body 30, and the third reset spring 40 is used for achieving pressing and resetting of the second key body 30. The second key body 30 and the first key body 33 have the same structure. An upper surface of the second key body 30 is also provided with second teeth 331 and a convex top column 332. The third teeth 50 are located on a housing of the third connecting member 102, and the third teeth 50 are arranged corresponding to and meshed with the second teeth 331 on the second key body 30. In this example, a bottom of the third connecting member 102 is provided with an avoidance groove 1021 with a certain depth and length, and a middle of the avoidance groove 1021 is provided with a rectangular passing hole 1022 in a lengthwise direction. The third teeth 50 are evenly arranged on opposite sides of the rectangular passing hole 1022, the second key body 30 is positioned in the avoidance groove 1021, and the top column 332 of the second key body 30 passes through the rectangular passing hole 1022, penetrate the lower housing 1012 and extends out of the housing of the third connecting member 102. When the second teeth 331 on the second key body 30 are meshed with the third teeth 50 on the third connecting member 102, the third connecting member 102 is in a locked state. When the user needs to adjust a pitching angle or a horizontal state of the base plate 1, the user only needs to press the second key body 30. When the second teeth 331 on the second key body 30 are separated from the third teeth 50 on the third connecting member 102, the third connecting member 102 is in an unlocked state. In this case, the user moves the third connecting member 102 back and forth, such that the base plate 1 rotates up and down to adjust the horizontal state of the base plate 1.

Thus, in the present disclosure, the supporting assembly 11 is arranged, and horizontal support for the base plate 1 is realized through the supporting assembly 11, such that stability of the base plate is improved. Furthermore, the base plate 1 is rotationally connected to the base 2, and the pitching angle of the base plate 1 can be controlled through adjustment of the supporting assembly 11, so as to optimize user experience.

Example 4

Figure 12:
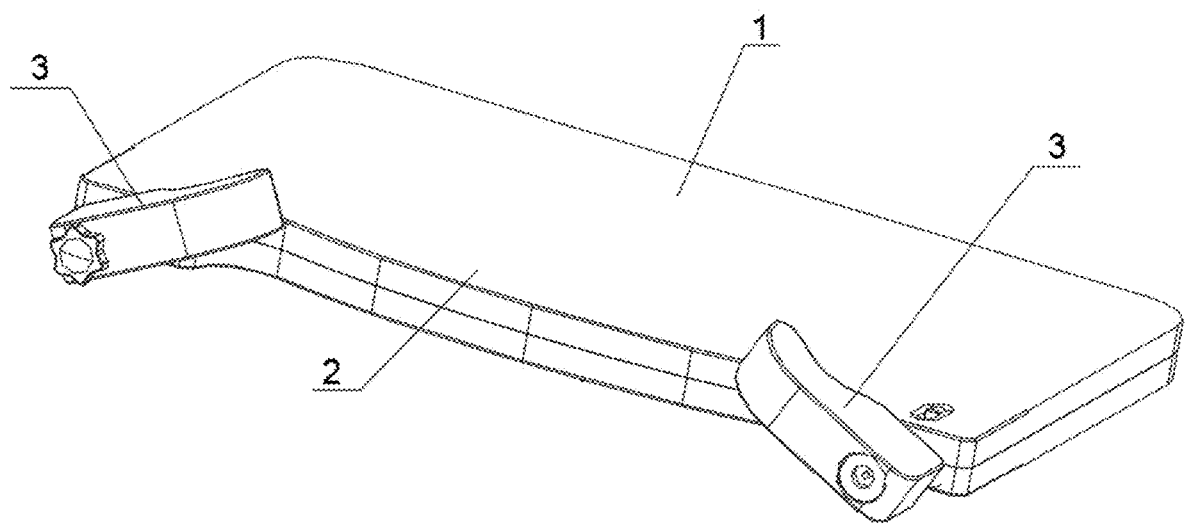
FIG. 12 is a schematic structural diagram of a base plate and a base in Example 4 of the present disclosure.
Figure 13:
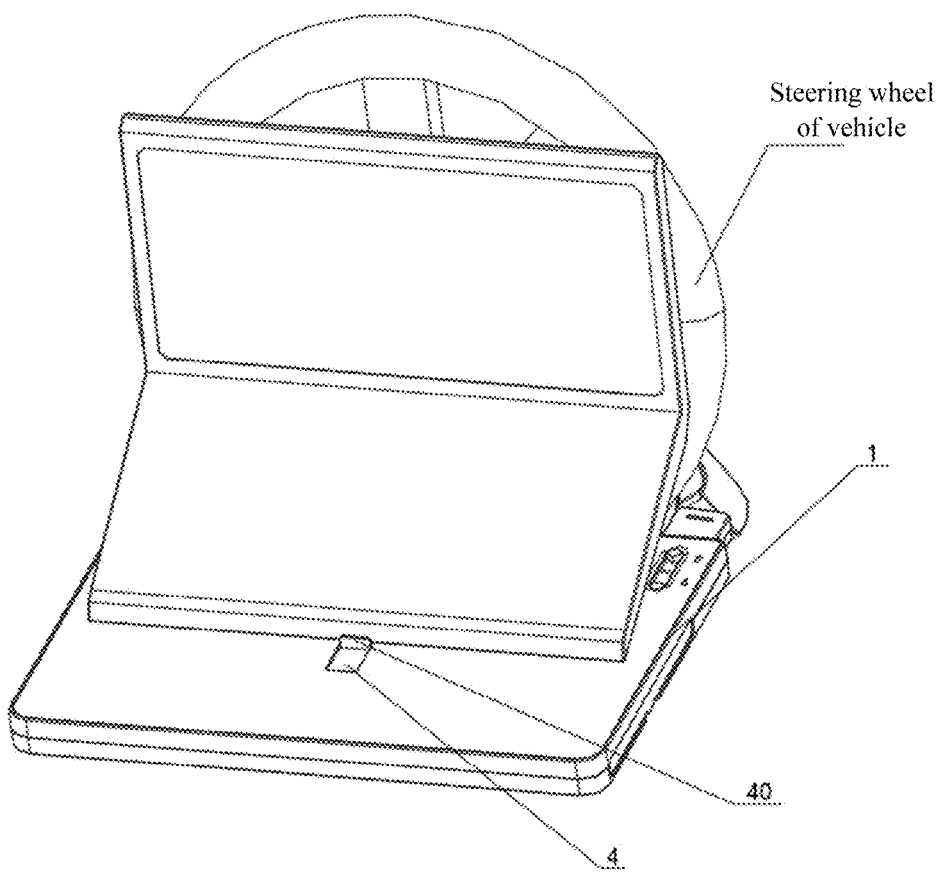
FIG. 13 is a schematic diagram showing a state in which a limiting arm limits a device in Example 5 of the present disclosure.
Figure 14:
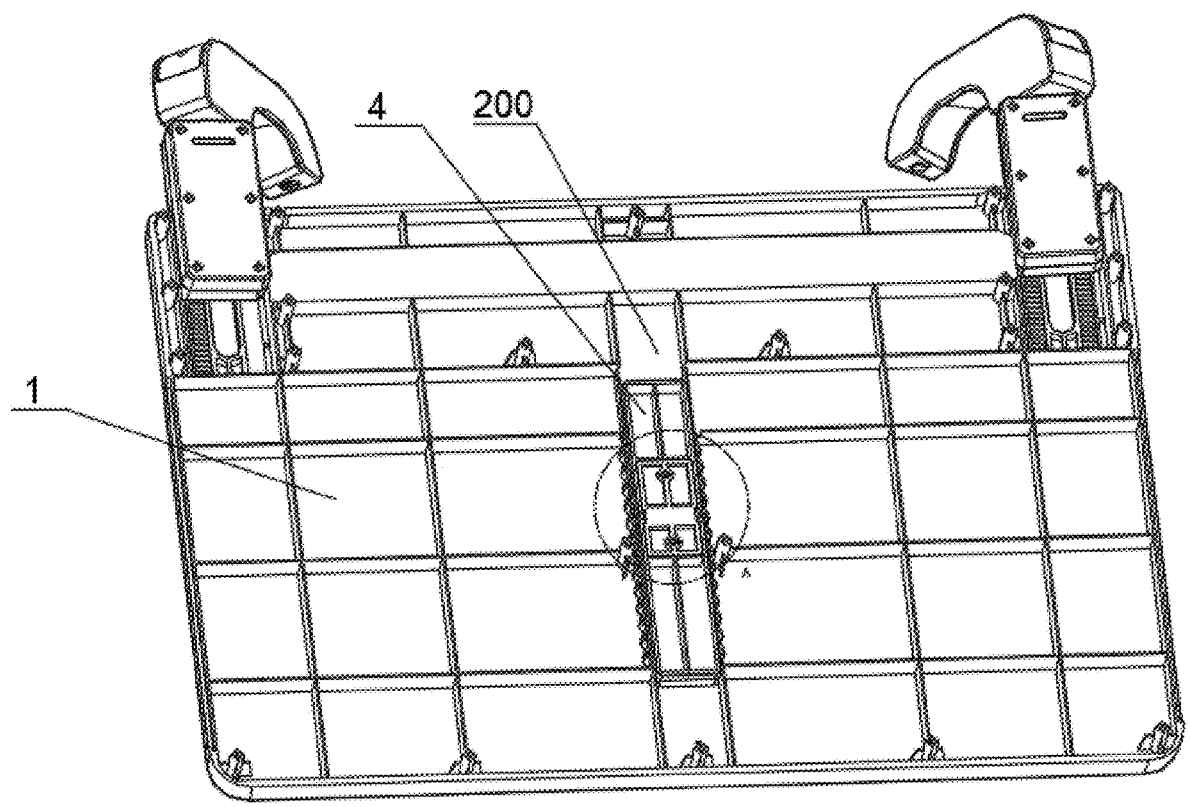
FIG. 14 is a schematic diagram of an integral structure of a limiting mechanism in Example 5 of the present disclosure.
Figure 15:
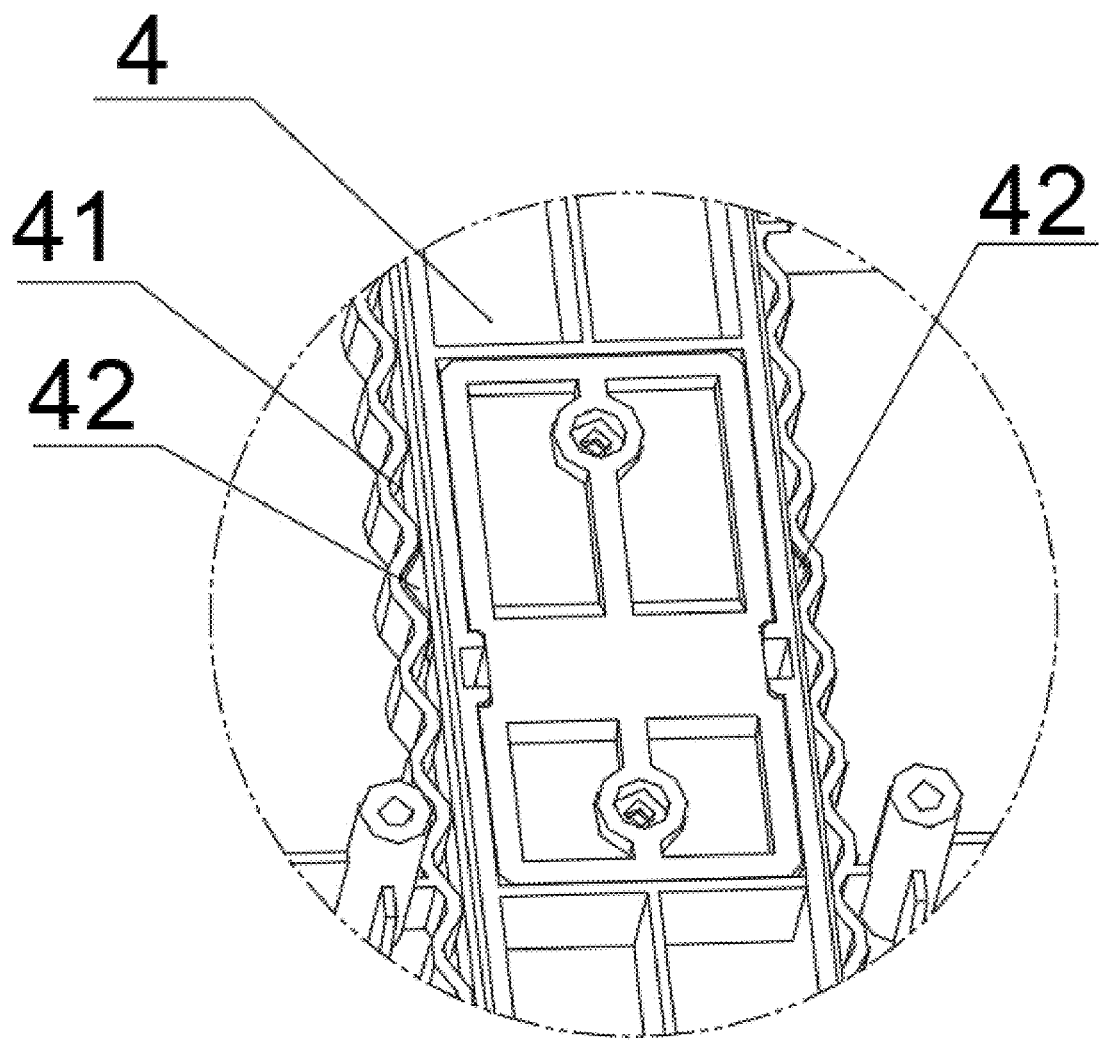
FIG. 15 is a partially enlarged schematic diagram of FIG. 14 in Example 5 of the present disclosure.
Figure 16:
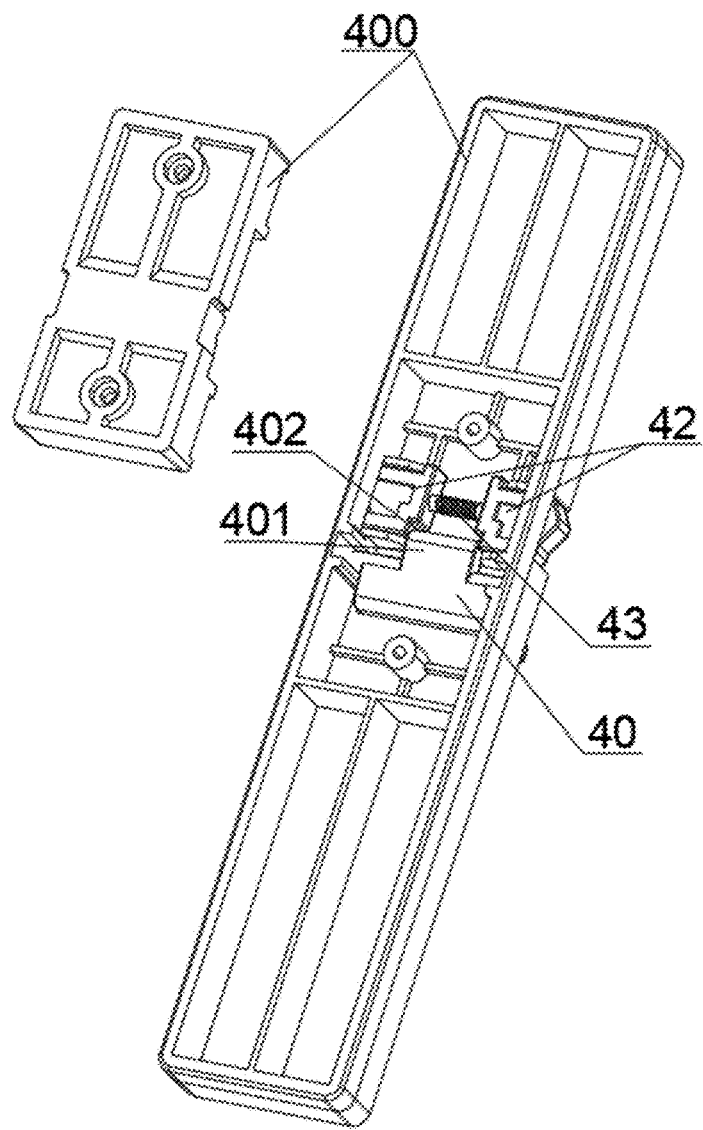
FIG. 16 is a schematic diagram of an internal structure in an unfolded state of a limiting arm in Example 5 of the present disclosure.
Figure 17:
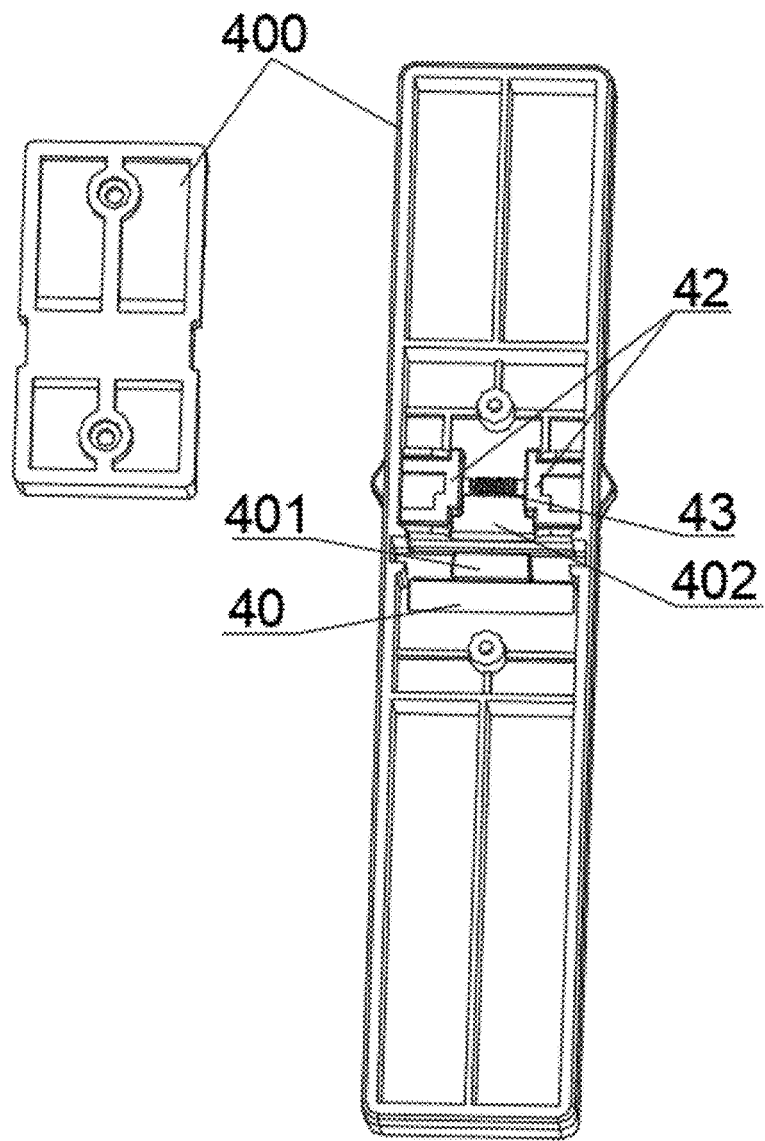
FIG. 17 is a schematic diagram of an internal structure in a folded state of a limiting arm in Example 5 of the present disclosure.
Figure 18:
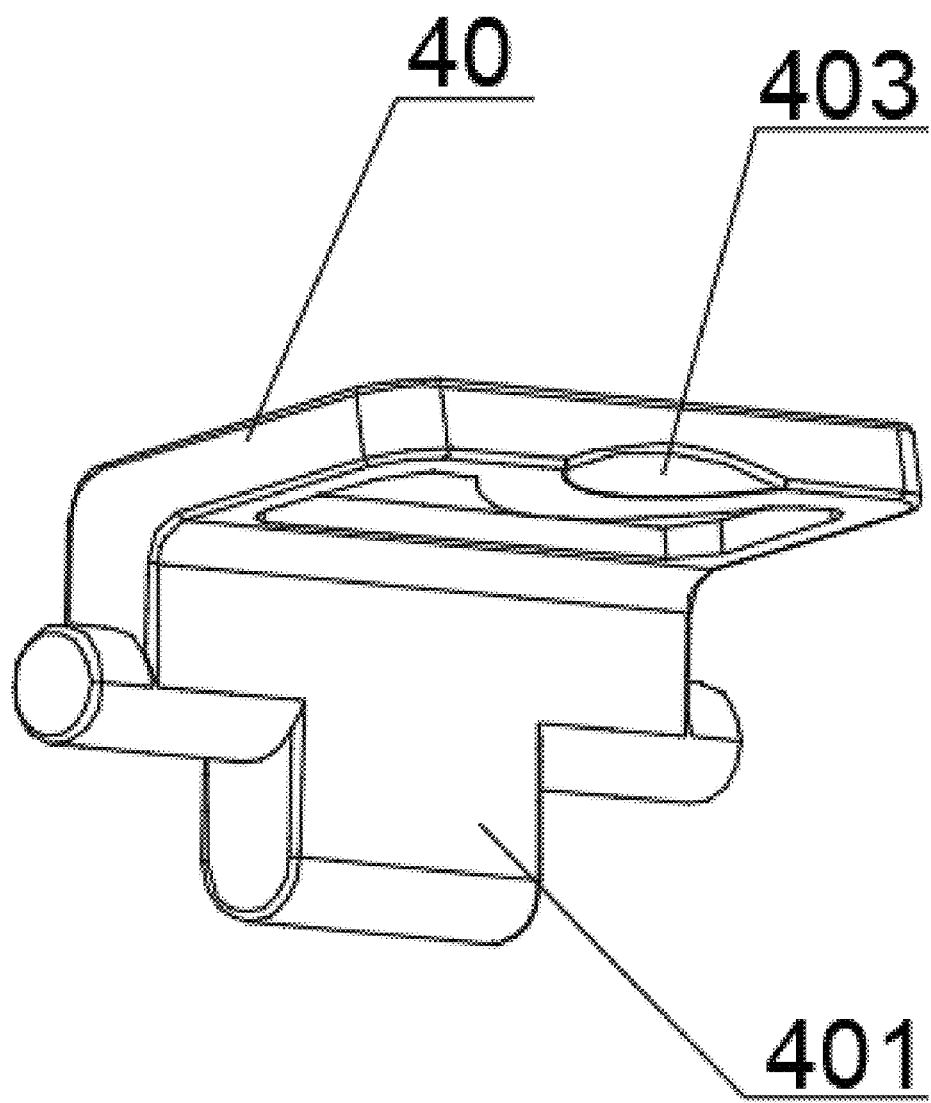
FIG. 18 is a schematic diagram of an integral structure of a limiting arm in Example 5 of the present disclosure.
Figure 19:
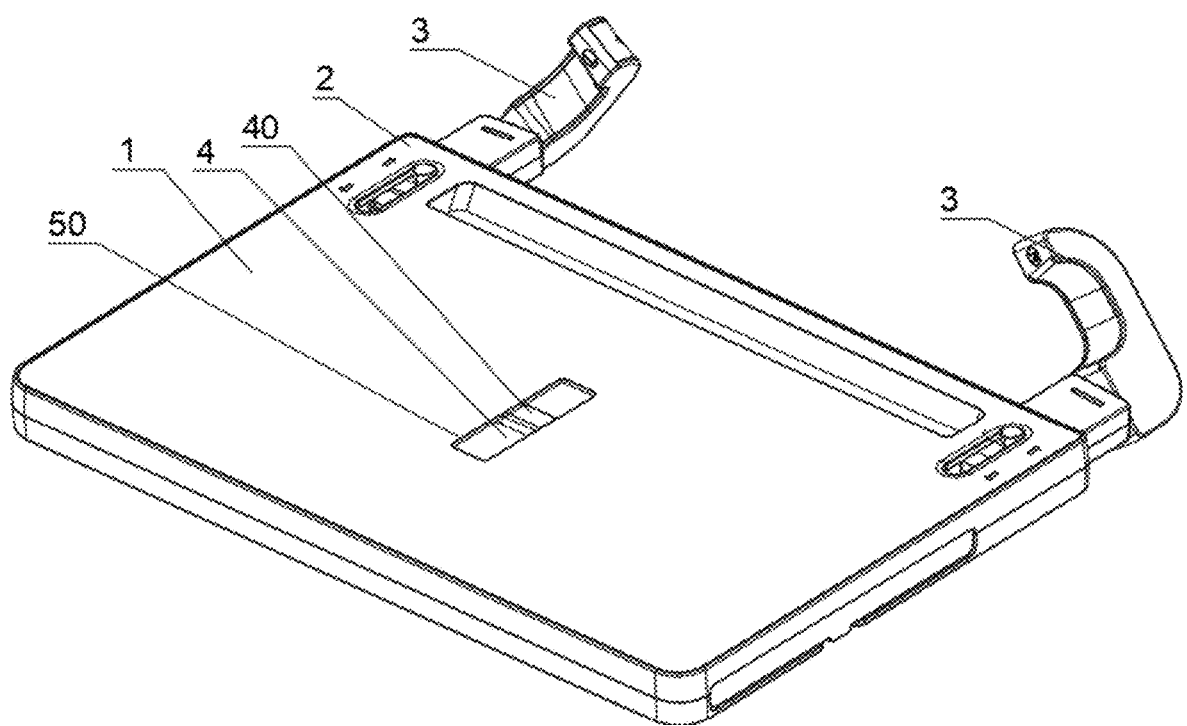
FIG. 19 is a schematic diagram of an integral structure of Example 5 of the present disclosure.

As shown in FIG. 12, a vehicle-mounted table plate fixed to a steering wheel, including a base plate 1 and a base 2, where the base plate 1 is fixedly connected at one end of the base 2. At least two clamping arms 3 having the same structure are arranged and are detachably connected at a front end of the base 2 in a back-and-forth stretchable manner, each clamping arm 3 includes a clamping hook 32 rotationally connected to a front end of the clamping arm 3, and the clamping hooks 32 are used for being clamped on the steering wheel of a vehicle. Clamping gaps between the clamping hooks 32 and the base 2 are adjusted by moving the clamping arms 3 back and forth to achieve mounting and fixing of the table plate fixed to a steering wheel. In this example, connection between the two clamping arms 3 and the base 2 has the same structure as that in Example 1 or Example 2 except that integral molding design is selected for the base 2 and the base plate 1, such that the overall structure is simpler, and the table plate can be adapt to different use scenarios.

Example 5

As shown in FIGS. 13-18, a vehicle-mounted table plate fixed to a steering wheel, where a base plate 1 further includes a limiting mechanism 4 fixedly connected or slidably connected back and forth on the base plate 1, and the limiting mechanism 4 includes a limiting arm 40 fixedly connected or rotationally connected on the limiting mechanism 4. The limiting mechanism 4 is horizontally arranged in a lengthwise direction of the base plate 1 or longitudinally arranged inside the base plate 1 in a width direction of the base plate 1. In this example, one limiting mechanism 4 is arranged, and the limiting mechanism 4 is located at a middle of the base plate 1. The limiting arm 40 is an L-shaped structure, and the limiting arm 40 is rotationally connected to the limiting mechanism 4. A track cavity 200 with a certain length is longitudinally arranged inside a housing of the base plate 1 in a width direction of the base plate 1, the limiting mechanism 4 is slidably arranged in the track cavity 200 back and forth, and the length of the track cavity 200 is longer than that of the limiting mechanism 4, such that the limiting mechanism 4 can move back and forth conveniently. Fourth tooth patterns 41 are arranged on an inner wall of one side or inner walls of two opposite sides of the track cavity 200. A limiting hole 50 is formed at a top of the track cavity 200, the limiting arm 40 passes through the limiting hole 50, and when the limiting mechanism 4 moves back and forth, the limiting arm 40 moves back and forth in the limiting hole 50. The limiting mechanism 4 further includes a housing 400, where the housing 400 is composed of a cuboid upper housing and a detachable bottom housing, and the bottom housing is fixedly connected to a bottom of the cuboid upper housing through screws or buckles. An accommodating cavity is formed between the cuboid upper housing and the bottom housing, two lock catches 42 that are arranged left and right oppositely and a spring 43 are arranged in the accommodating cavity, and the spring 43 is arranged between the two lock catches 42 to form elastic support for the two lock catches 42. The two lock catches 42 are slidably connected in the accommodating cavity in a left-right direction, front ends of the two lock catches 42 penetrate through the corresponding portion of the housing 400 and extend into the fourth tooth patterns 41 on the track cavity 200, and the front ends of the two lock catches 42 match and are engaged with the fourth tooth patterns 41. Atop of the accommodating cavity is provided with a rectangular hole, and a top end of the limiting arm 40 penetrates the rectangular hole and is rotationally connected in the accommodating cavity through a rotating shaft. A locking groove 402 is formed between the two lock catches 42, a bottom end of the limiting arm 40 extends downward to form a locking platform 401, and the locking groove 402 matches the locking platform 401. When the limiting arm 40 is rotated to the left or right by a user and the limiting arm 40 is in an unfolded state, the locking platform 401 is locked into the locking groove 402, and the locking platform 401 cannot slide left and right. In this case, the two lock catches 42 are firmly locked in the fourth tooth patterns 41 on the track cavity 200, the limiting mechanism 4 is in a locked state, and the limiting mechanism 4 cannot move forward and backward. When the user needs to move the limiting mechanism 4 forward and backward, the limiting arm 40 is rotated in a reverse direction, the locking platform 401 on the limiting arm 40 is separated from the locking groove 402, the limiting mechanism 4 is in an unlocked state in this case, and the limiting arm 40 is in a folded state. The user can push the limiting mechanism 4 forward and backward to adjust an inclined placement angle of a device on the base plate 1. The limiting mechanism 4 has a certain damping effect during moving through cooperation of the fourth tooth patterns 41, the lock catches 42 and the spring 43, such that an experience feeling of the user is improved. A top end of the limiting arm 40 is provided with a buckling groove 403, such that the limiting arm 40 in the folded state can be conveniently held and rotated.

In this way, the limiting arm 40 is arranged, such that when a notebook computer or a tablet computer is used, the limiting arm 40 can be used for limiting the notebook computer or the tablet computer, so as to prevent the computer from sliding. Moreover, the limiting mechanism 4 can be moved forward and backward, such that the computer can be moved forward and backward, and an inclined angle of the computer during placement can be adjusted, thereby finding an optimal visual angle and meeting use requirements of different users.

Working principle: the present disclosure includes a base plate 1, a base 2 and two clamping arms 3 arranged on a left side and a right side of the base plate 2 respectively. During use, firstly, the clamping arms 3 are unlocked by pressing the first key bodies 33 or loosening the adjusting threaded rods 37, and the clamping arms 3 are moved backward to proper positions. In this case, the clamping hooks 32 on the clamping arms 3 are far away from the base plate 2, such that sufficient mounting space is reserved. The clamping hooks 32 on the clamping arms 3 are rotated, the arc-shaped grooves 321 in the two clamping hooks 32 are made to be aligned with a back surface of an annular grip on the steering wheel one by one, and the annular grip is snapped into the arc-shaped groove bodies. A corresponding front surface of the annular grip on the steering wheel makes contact with the arc-shaped avoidance groove 24 in the base 2. Then, the clamping arms 3 are pushed forward one by one or the adjusting threaded rods 37 are tightened one by one.

The clamping arms 3 move toward the base 2, and the clamping gaps between the clamping hooks 32 and the base 2 decrease until the clamping hooks 32 firmly clamp the annular grip on the steering wheel, forming a clamping state of the clamping hooks 32 and the base 2 to the steering wheel of the vehicle, thereby completing preliminary mounting and fixation of the vehicle-mounted table plate fixed to a steering wheel. Finally, by adjusting the third connecting member 102, the first connecting member 100 is made to make contact with the steering wheel of the vehicle, forming a supporting state to the base plate 1, the user can adjust a forward and backward moving distance of the third connecting member 102, thereby adjusting the horizontal supporting state of the supporting assembly 11 to the base plate 1. Moreover, longitudinal accommodating space of the base plate 1 can also be increased by moving the clamping arms 3 forward and backward, such that objects placed on the base plate 1 are prevented from colliding with the steering wheel.

To sum up, in the present disclosure, the two clamping arms 3 which can move back and forth are arranged, and the user is allowed to adjust the clamping gaps between the base 2 and the clamping hooks 32, so as to adapt to steering wheels of different vehicle models. Moreover, by utilizing cooperation between the clamping hooks 32 and the base, a fixing effect is better, and market applicability and use scenarios of the vehicle-mounted table plate fixed to a steering wheel are effectively enhanced.

The horizontal support for the base plate 1 is realized through the supporting assembly 11, such that stability of the base plate is improved. Furthermore, the base plate 1 is rotationally connected to the base 2, and the pitching angle of the base plate 1 can be controlled through adjustment of the supporting assembly 11, so as to optimize the user experience.

The foregoing are merely the preferred embodiments of the present disclosure and are not intended to limit the present disclosure, and various modifications and changes may be made by those skilled in the art. Any modifications, equivalent substitutions, improvements, etc. within the spirit and principles of the present disclosure are intended to fall within the scope of protection of the present disclosure.

What is claimed is:

1. A vehicle-mounted table plate fixed to a steering wheel, comprising:
    a base plate;
    a base, wherein the base plate is connected at one end of the base; and
    at least two clamping arms, wherein the at least two clamping arms are connected at one end of the base, each of the at least two clamping arms comprises a clamping hook connected to one end of the clamping arms, the clamping hook is configured to be clamped on the steering wheel of a vehicle, and clamping gaps between the clamping hook and the base are adjusted by moving the at least two clamping arms back and forth;

wherein two mounting cavities for mounting the at least two clamping arms are formed in the base, avoidance holes are formed in tops of the mounting cavities, and first teeth are arranged on one side or two sides of each of the avoidance holes and are located on an inner wall of the mounting cavities; and an inner wall of each of the mounting cavities is provided with first teeth, and the first teeth and the avoidance holes are positioned on one wall surface of the mounting cavities.

2. The vehicle-mounted table plate fixed to a steering wheel according to claim 1, wherein each of the at least two clamping arms comprises a sliding seat, the clamping hook is connected to the sliding seat, the clamping hook is provided with an arc-shaped groove, a flexible pad is arranged in the arc-shaped groove, and the at least two clamping arms are arranged in the mounting cavities through the sliding seat.

3. The vehicle-mounted table plate fixed to a steering wheel according to claim 2, wherein the sliding seat comprises a first key body and a first reset spring that are arranged inside the sliding seat, the first reset spring is located below the first key body, and the first reset spring is configured to press the first key body; and the first key body comprises second teeth and a convex top column that are arranged on an upper surface of the first key body, the second teeth and the convex top column penetrate through a housing of the sliding seat, the second teeth are meshed with the first teeth in the mounting cavities, and the convex top column penetrates the avoidance holes and extends out of the base.

4. The vehicle-mounted table plate fixed to a steering wheel according to claim 1, wherein each of the at least two clamping arms comprises a rotating shaft connected to the clamping hook, a shaft hole matching the rotating shaft is formed one end of the base, the rotating shaft is inserted in the shaft hole, and the clamping arms are connected to the base through the rotating shaft.

5. The vehicle-mounted table plate fixed to a steering wheel according to claim 4, wherein the base comprises a second reset spring, a fixing nut and an adjusting threaded rod, the second reset spring and the fixing nut are located inside a housing of the base, through holes are reserved in the rotating shaft and the clamping hook, the fixing nut is arranged in the shaft hole, and the adjusting threaded rod passes through the through hole in the clamping arm and is in butt joint with the fixing nut in the shaft hole; and the second reset spring is arranged on the adjusting threaded rod, and the second reset spring abuts against the rotating shaft on the clamping hook.

6. The vehicle-mounted table plate fixed to a steering wheel according to claim 1, wherein the base plate comprises a supporting assembly arranged on the base plate, one end of the supporting assembly is connected to the base, and the other end of the supporting assembly is connected to the base plate.

7. The vehicle-mounted table plate fixed to a steering wheel according to claim 6, wherein the supporting assembly comprises a first connecting member, a second connecting member and a third connecting member, one end of the first connecting member is connected to the base, the other end of the first connecting member is connected to the second connecting member, one end of the third connecting member is connected to the base plate, the third connecting member is connected to the second connecting member, a locking mechanism is arranged between the third connecting member and the second connecting member, and the locking mechanism is used for locking and unlocking the third connecting member.

8. The vehicle-mounted table plate fixed to a steering wheel according to claim 7, wherein the locking mechanism comprises a second key body, a third reset spring and third teeth, the second key body and the third reset spring are arranged inside a housing of the second connecting member, the third reset spring is located below the second key body, and the third reset spring is configured to press the second key body; and an upper surface of the second key body is also provided with second teeth and a convex top column, the third teeth are arranged inside a housing of the third connecting member, and the third teeth are meshed with the second teeth on the second key body.

9. The vehicle-mounted table plate fixed to a steering wheel according to claim 1, wherein the base plate further comprises a limiting mechanism connected on the base plate, and the limiting mechanism comprises a limiting arm connected on the limiting mechanism.

* * * * *